(12) United States Patent
Ringler

(10) Patent No.: US 9,192,253 B2
(45) Date of Patent: Nov. 24, 2015

(54) BOX, RACK, SYSTEM AND METHOD FOR THE PRESENTATION OF PRODUCTS

(71) Applicant: IFCO Systems GmbH, Pullach (DE)

(72) Inventor: Werner Ringler, Weisendorf (DE)

(73) Assignee: IFCO Systems GmbH, Pullach (DE)

( * ) Notice: Subject to any disclaimer, the term of this patent is extended or adjusted under 35 U.S.C. 154(b) by 299 days.

(21) Appl. No.: 13/845,285

(22) Filed: Mar. 18, 2013

(65) Prior Publication Data

US 2013/0212985 A1 Aug. 22, 2013

Related U.S. Application Data

(63) Continuation of application No. PCT/EP2010/063800, filed on Sep. 20, 2010.

(51) Int. Cl.
*B65B 5/00* (2006.01)
*A47F 7/00* (2006.01)
*A47F 3/14* (2006.01)
*A47F 5/16* (2006.01)
*B65D 83/00* (2006.01)
*B65G 1/07* (2006.01)
*B65D 25/00* (2006.01)

(52) U.S. Cl.
CPC . *A47F 7/00* (2013.01); *A47F 3/142* (2013.01); *A47F 5/16* (2013.01); *B65B 5/00* (2013.01); *B65D 25/00* (2013.01); *B65D 83/0005* (2013.01); *B65G 1/07* (2013.01); *A47F 2005/165* (2013.01)

(58) Field of Classification Search
CPC ..... A47F 3/142; A47F 7/00; A47F 2005/165; B65D 1/38; B65D 5/00; B65D 5/52; B65D 5/5213; B65D 5/721; B65D 5/724; B65D 19/36; B65D 21/083; B65D 25/00; B65D 83/0005
USPC .............................................. 211/59.2, 85.17
See application file for complete search history.

(56) References Cited

U.S. PATENT DOCUMENTS 940,807 A * 11/1909 Hart ............................ 211/85.4
3,203,554 A 8/1965 Pendergrast, Jr. et al.

(Continued)

FOREIGN PATENT DOCUMENTS

DE        199 48 940 A1    4/2000
DE    10 2004 048 428 A1    4/2006

(Continued)

OTHER PUBLICATIONS

Official Communication issued in corresponding Japanese Patent Application No. 2013-528521, mailed on Mar. 11, 2014.

(Continued)

*Primary Examiner* — Joshua Rodden
(74) *Attorney, Agent, or Firm* — Keating & Bennett, LLP

(57) ABSTRACT

A box includes a floor, two end walls and two side walls. In the floor, a plurality of openings are provided, which are dimensioned to each receive a supporting bar. The openings are arranged to evenly lift a carrier introduced into the box with supporting bars introduced into the openings and position the same at a position above the floor. A rack for receiving such a box includes a supporting frame and the plurality of supporting bars which are mountable to the supporting frame. Further, a system and a method for the presentation of products are described.

4 Claims, 7 Drawing Sheets

(56) References Cited

U.S. PATENT DOCUMENTS

| | | | |
|---|---|---|---|
| 6,601,742 | B2 | 8/2003 | Hickman |
| 2012/0181271 | A1* | 7/2012 | Dekkers .................. 220/4.33 |

FOREIGN PATENT DOCUMENTS

| | | | | |
|---|---|---|---|---|
| EP | 1 285 867 | A2 | 2/2003 | |
| FR | 2 706 732 | A1 | 12/1994 | |
| FR | 2855954 | A1 * | 12/2004 | .............. A47F 10/02 |
| FR | 2926966 | A1 * | 8/2009 | ................ A47F 5/16 |
| JP | 51-48187 | U | 4/1976 | |
| JP | 56-4596 | A | 1/1981 | |
| JP | 57-117335 | U | 7/1982 | |
| JP | 58-121865 | U | 8/1983 | |
| JP | 58-180172 | U | 12/1983 | |
| JP | 60-18965 | U | 2/1985 | |
| JP | 62-42514 | U | 3/1987 | |
| JP | 11-128033 | A | 5/1999 | |
| SU | 1440802 | A1 | 11/1988 | |
| UY | 32701 | A | 7/2010 | |
| WO | WO 9532651 | A1 * | 12/1995 | ................ A47F 5/10 |

OTHER PUBLICATIONS

English translation of Official Communication issued in corresponding Russian Patent Application No. 2013118315, mailed on Oct. 29, 2013.

Official Communication issued in corresponding New Zealand Patent Application No. 608122, mailed on Sep. 26, 2013.

Official Communication issued in International Patent Application No. PCT/EP2010/063800, mailed on Jul. 18, 2011.

English translation of Official Communication issued in corresponding International Application PCT/EP2010/063800, Issued on Mar. 26, 2013.

* cited by examiner

BOX, RACK, SYSTEM AND METHOD FOR THE PRESENTATION OF PRODUCTS

CROSS-REFERENCE TO RELATED APPLICATION

This application is a continuation of copending International Application No. PCT/EP2010/063800, filed Sep. 20, 2010, which is incorporated herein by reference in its entirety.

BACKGROUND OF THE INVENTION

Embodiments of the invention relate to a box, in particular a crate or a transport box for the transport of goods, for example food, and a rack for receiving the box for a presentation of the products located therein and to a system and a method for the presentation of products.

Boxes or crates for receiving products are known in conventional technology. Such crates are for example manufactured from plastics and apart from a rectangular floor include opposing end sides or end walls and opposing sidewalls. The height of the corresponding walls is selected to arrange a predetermined number of products within the crate. Such crates are for example used, during the harvest of food, like for example vegetables or fruits, to directly introduce the harvested vegetables or the harvested fruit on the field into the boxes and then provide the filled boxes to the resellers and finally to the points of sale, like for example supermarkets or the like. The boxes may for example be manufactured from plastics, wherein, however, also other materials are possible, like for example wood, metal or the like. The boxes may comprise foldable walls which enables folding down the boxes after emptying the same so that the sidewalls are folded down in the direction of the floor so that for the back transport of the boxes the volume of the same is minimal and thus a large number of boxes may be transported back simultaneously.

In the boxes a carrier or support is located for example in the form of a cardboard box or a plastics plate or the like which is introduced onto the floor of the box before filling same and on which the products rest.

Once the filled box for example reaches the supermarket, the same is arranged as a whole on a corresponding rack which is suitable for receiving the box. The rack may for example receive the box in an inclined way with respect to the footprint of the rack in order to present the product located within the box in an advantageous way for the customer.

If several layers of products are arranged on top of each other in the box, the above mentioned presentation works well as long as only one or only few layers of products have been removed from the box. If, however, ever more layers are removed, the situation may occur that from a point of view of the observer who looks at the box the products which are contained in the last or bottom layers may only hardly be seen or not be seen at all. This is for example the case when the box is arranged in an inclined way and the last layer of products has been removed by half. From an angle of view of a customer or observer the box then seems to be empty due to the inclined arrangement as the remaining products within the box are arranged in an area of the box floor which is shielded from the view of the observer by a wall of the box facing the observer so that the box already seems to be empty.

This situation is undesired as then the products may not be seen and thus remain within the box and finally have to be discarded as they were not sold.

Another disadvantage of this type of presentation is that the more products are removed the emptier the box seems to be which is undesired with respect to an optimal presentation of the products, as customers may for example not want to select products located in the lower part of the box as the same may unjustly be regarded as impaired by products arranged above the same.

SUMMARY

According to an embodiment, a box may have: a floor; two end walls; two side walls; and a plurality of openings in the floor; wherein each of the openings is dimensioned to receive a supporting bar, and wherein the openings are arranged to uniformly lift a carrier introduced into the box using supporting bars introduced into the openings and position the same at a position above the floor.

According to another embodiment, a rack for receiving at least one box mentioned above may have: a supporting frame for receiving the box; and a plurality of supporting bars, mountable to a supporting frame such that the supporting bars, when placing the box onto the supporting frame penetrate through the openings in the floor of the box into the interior of the box.

According to another embodiment, a system for presenting products may have: a box mentioned above; and a rack mentioned above; wherein the box contains several layers of products, wherein the box is arranged on the rack with the supporting bars in the first position, when the box contains a predetermined number of layers of products, and wherein the box is arranged on the rack with the supporting bars in the second position, when one or several layers of the products have been removed from the box.

According to another embodiment, a method for the presentation of products may have the steps of: arranging a box mentioned above, which contains a predetermined number of layers of products, on a rack mentioned above, whose supporting bars are in the first position; and if one or several layers of products have been removed from the box, moving the supporting bars from the first position into the second position, whereby the supporting bars penetrate into the box and lift the inserted carrier with the products arranged thereon with respect to the floor of the box.

The present invention provides a box with a floor, two end walls and two sidewalls. In the floor, a plurality of openings are formed which are dimensioned to receive one support bar each. Further, the openings are arranged to uniformly lift a carrier inserted into the box at support or carrying bars introduced in the openings and position the same at a position above the floor. According to embodiments of the invention the openings have a diameter of 0.1 cm to 5 cm.

According to embodiments of the invention the openings are arranged symmetrically to a center point of the floor surface.

According to embodiments of the invention, one opening each is provided in one of the corners of the floor and at least one opening is provided in a central area of the floor. According to embodiments, in the central area of the floor four openings are provided, wherein according to further embodiments of the invention the openings in the corner each have the same distance to the edges respectively adjacent to the openings, wherein this distance is between approximately ⅛ to approximately ¼ of the length of the short edge. The openings in the central area each include a first distance to the long edges of the floor closest to the openings and a second distance each to the short edges of the floor closest to the openings, wherein the first distance is between approximately ⅓ and approximately ½ of the length of the short edge and the second distance is between approximately ¼ and approximately ½ of the length of the long edge.

According to embodiments of the invention, the carrier introduced into the box is a carrier of a rigid material which when supported at different positions maintains a level shape, i.e. is not bent. The rigid material may be thick paper, cardboard, a wooden plate or a plastics plate.

According to embodiments of the invention, in the floor and/or in the walls the box may further comprise a plurality of ventilation openings to enable a circulation of air through the box. According to embodiments of the invention the box may be foldable, i.e. the end walls and the sidewalls may be configured to be foldable with respect to the floor. According to other embodiments of the invention the box is manufactured from plastics and may serve for receiving and/or for the transport of food, for example fruit, vegetables, meat, etc.

The present invention further provides a rack for receiving at least one box according to embodiments of the invention, wherein the rack includes a frame or supporting frame for receiving the box and a plurality of supporting bars. The supporting bars are mounted to the frame such that the supporting bars, when placing the box onto the frame, penetrate into the interior of the box through the openings in the floor of the box.

According to embodiments of the invention, the supporting bars are movably arranged at the frame to be moved between a first position and a second position. In the first position, the supporting bars are arranged so that the same do not penetrate the interior of a box arranged on the supporting frame. In a second position, the supporting bars are arranged in order to penetrate into the interior of a box arranged on the frame.

According to embodiments of the invention, the supporting bars are further implemented to be arranged so that the same may penetrate into the interior of the box by different penetration depths. For example, the supporting bars may be implemented telescopically or longitudinally shiftable, possibly motorically, to thus set different penetration depths. According to embodiments of the invention, the frame is implemented to carry or support the box at an angle to the footprint or supporting surface on which the frame is arranged.

The present invention further provides a system for the presentation of products, wherein the system includes a box according to embodiments of the invention and a rack according to embodiments of the invention. The box contains several product layers, wherein the box is arranged on the rack with the supporting bars or carrying bars in the first position, when the box contains all or a predetermined number of layers of products. The box is arranged on the rack with the supporting bars in the second position when one or several layers of the products have been removed from the box.

According to embodiments of the invention, the penetration depth of the supporting bars into the interior of the box is increased with a decreasing number of product layers so that a product layer is arranged close to the upper edge of the box.

The present invention further provides a method for the presentation of products arranged in several layers of a box according to embodiments of the invention, wherein a full box is arranged on a rack according to embodiments of the invention whose supporting bars are in the first position. If one or several layers of products have been removed from the box, the supporting bars are moved from the first position into the second position, whereby the supporting bars penetrate or enter the box and lift the integrated support or carrier with the products arranged thereon with respect to the floor of the box.

According to embodiments of the invention, the penetration depth of the supporting bars into the interior of the box is increased with a decreasing number of product layers, so that one product layer is arranged close to the upper edge of the box.

BRIEF DESCRIPTION OF THE DRAWINGS

Embodiments of the present invention will be explained in more detail below with reference to the accompanying drawings, in which:

FIG. 7 shows a schematically illustration of a rack according to one embodiment of the invention for receiving boxes according to embodiments of the invention, wherein

DETAILED DESCRIPTION OF THE INVENTION

Figure 1:
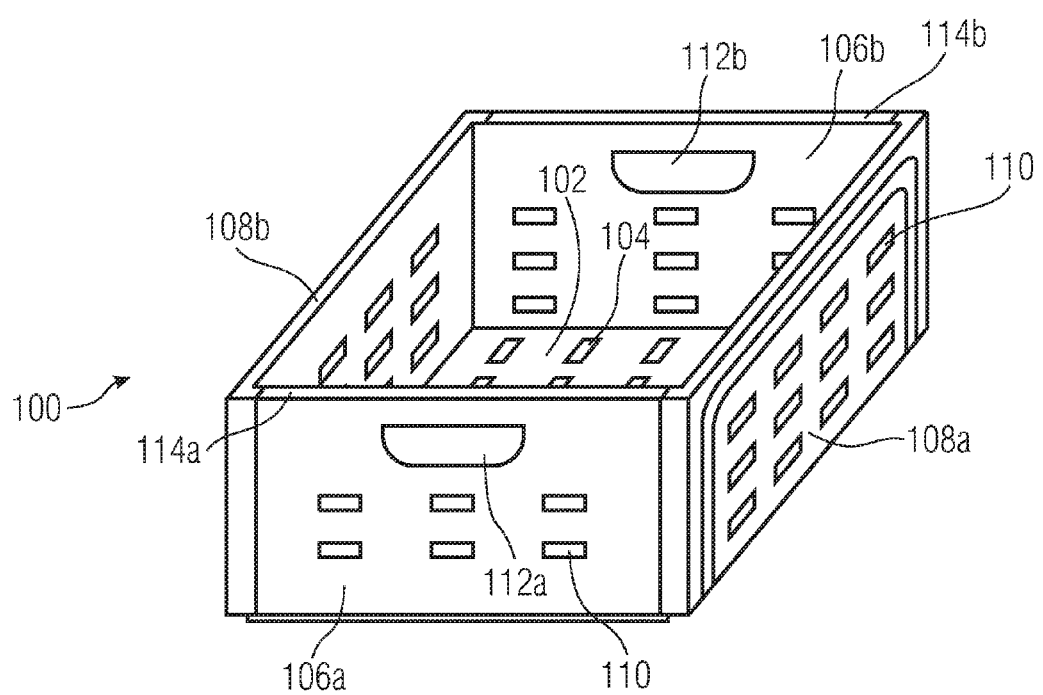
FIG. 1 shows an illustration of an exemplary box or crate suitable for receiving a plurality of products.

In the following, with respect to the Figures, embodiments of the invention are explained in more detail, wherein in the different Figures like or seemingly like elements are provided with the same reference numerals.

FIG. 1 shows an illustration of an exemplary box or crate suitable for receiving a plurality of several products. FIG. 1 shows a conventional box 100 comprising a rectangular floor 102 including a plurality of ventilation openings 104. Perpendicular to the floor surface 102 two opposing end walls 106a and 106a are arranged which are arranged basically perpendicular to the floor 102. Further, the box 100 includes two opposing side surfaces 108a and 108b. As it may be seen, both the end surfaces and also the side surfaces include ventilation openings 110. It is to be noted here that other boxes may be provided which include more or less ventilation openings 104, 110 or no ventilation openings. The end walls 106a and 106b further include a grip hole 112a, 112b for lifting the box, wherein the top edge 114a, 114b of the end walls 106a, 106b may be reinforced to prevent breaking through when lifting the box in the area of the grip holes 112a and 112b. The box 100 illustrated in FIG. 1 may be implemented foldable, i.e. the end surfaces and the side surfaces may be folded in into the direction of the floor 102, for example by an initial folding of the end walls 106a and 106b and a subsequent folding of the side walls 108a and 108b. By this, the volume of the box is minimized and when transporting the empty boxes back it is thus possible to simultaneously transport a large number of such boxes.

It is to be noted here, that according to other embodiments of the invention the box may not be implemented foldably, that the side and end walls are arranged fixed in the position illustrated in FIG. 1.

Figure 2:
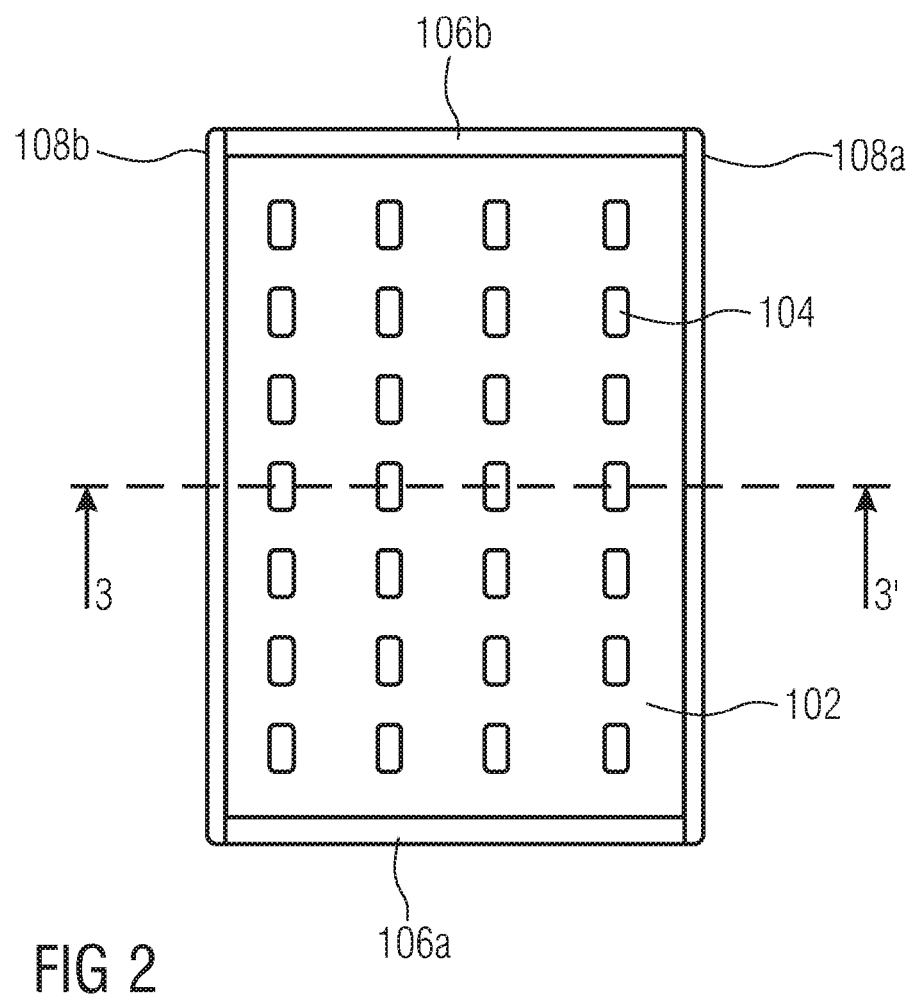
FIG. 2 shows a top view onto the box of FIG. 1.
Figure 3:
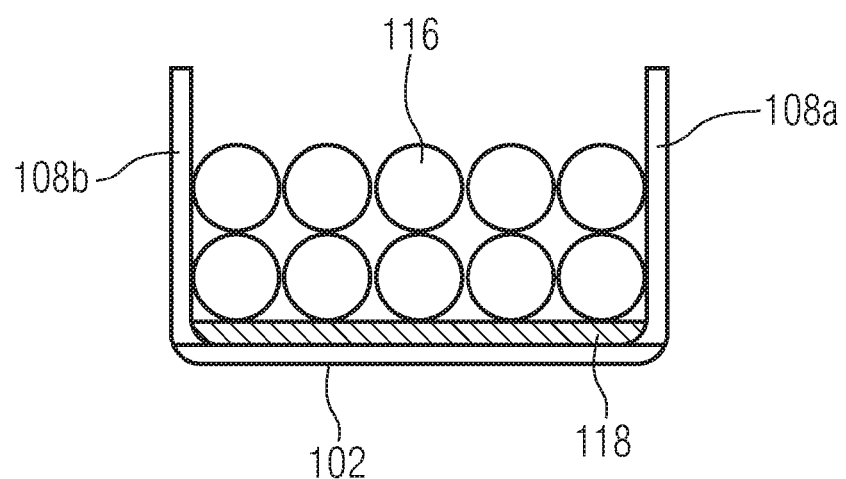
FIG. 3 shows a sectional view of the box along line 3-3' in FIG. 2 in a filled state with two layers of products.

FIG. 2 shows a top view onto the box of FIG. 1, wherein the floor 102 and the end walls 106a and 106b and the side walls 108a and 108b shown. Apart from the ventilation openings 104 the floor 102 includes no further openings. FIG. 3 shows a sectional view of the box along line 3-3' in FIG. 2, wherein in FIG. 3 the box is exemplarily illustrated in a filled state, wherein two rows of products 116 are arranged within the same. It is to be noted here that the filling of the box illustrated in FIG. 3 is only an example and was selected schematically for explaining the teachings of the invention, that, however, also more layers and differently shaped products may be contained. In FIG. 3 the floor 102 and the side walls 108a and 108b are illustrated between which the products 116 are arranged. Further, usually on the floor 102 a carrier 118 for example in the form of paper, a cardboard box, a plate of wood or plastics or the like is provided on which the bottommost layer of products 116 rests.

Figure 4:
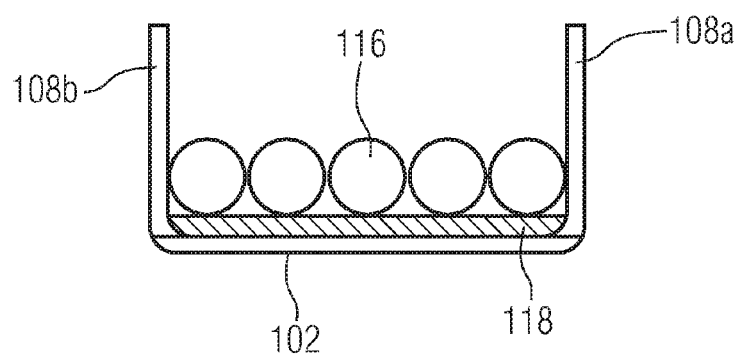
FIG. 4 shows an image similar to that in FIG. 3 wherein however already all products except for individual products in the bottommost layer have been removed.

FIG. 4 shows an image similar to that of FIG. 3, wherein, however, already all products except for individual products 116 have been removed from the bottommost layer, i.e. the layer present on the floor 112 with the carrier 118 arranged between the products 116 and the floor 102.

Figure 5:
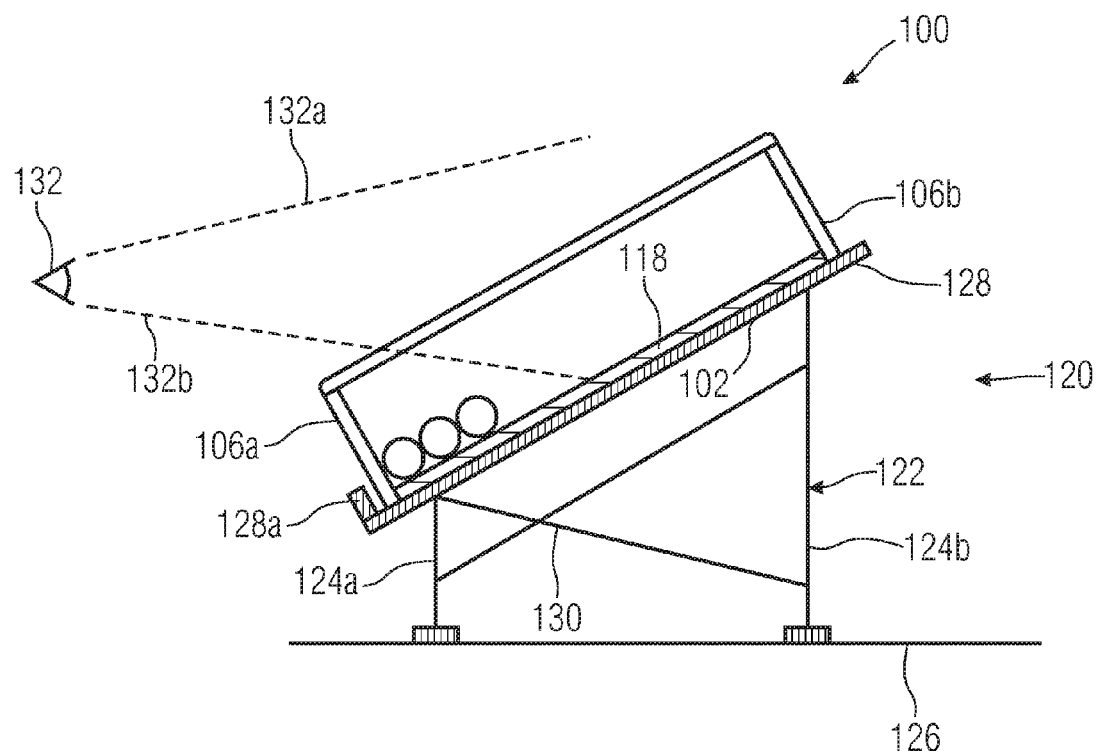
FIG. 5 shows a rack for receiving a box of FIGS. 1 to 4.

FIG. 5 shows a rack 120 for receiving a box 100 which was described above. The rack includes a carrying or supporting frame 122 with a plurality of stands or supporting legs 124a, 124b, whose bottom ends rest on a floor surface 126 and whose top ends include a supporting structure 128a for securely receiving the box 100. Further, a strutting 130 is provided to improve the structure and the stability of the support. In the embodiment illustrated in FIG. 5 the first or foremost supporting leg 124a is shorter than the back supporting leg 124b, so that the supporting structure 128 is inclined with respect to the floor 126 and comprises a projection or protrusion 128a which prevents a downward shifting of the box 100. Alternatively it may also be possible to provide the two supporting legs 124a and 124b with the same length so that the supporting structure 128 and thus the box arranged thereon is substantially parallel to the floor space 126 on which the rack 120 is arranged.

In FIG. 5, the box 100 is schematically illustrated with a partial filling. Similar to FIG. 4, already the products located above the last layer have been removed and likewise a part of the products from the bottom layer has already been removed so that only products 116 are arranged in the area adjacent to the end wall 106a. At 132, schematically a viewing position of an observer of the rack 120 with the box 100 arranged thereon is illustrated and, also schematically at 132a and 132b the angle of view of same. As it may be seen from the schematical illustration in FIG. 5, with such an implementation the situation may occur that an observer thinks the box is already empty, as the products 116 are located outside his angle of view. The same problem occurs when the box is arranged horizontally. Further, the presentation of the products 116 in the way described with reference to FIG. 5, either in the inclined arrangement of the box or in the horizontal arrangement of the box, is undesired, as it was explained above.

In order to prevent the problems explained above with reference to FIG. 5, as they occur with known conventional boxes, the present invention provides a new type of box which is explained in more detail in the following.

Figure 6:
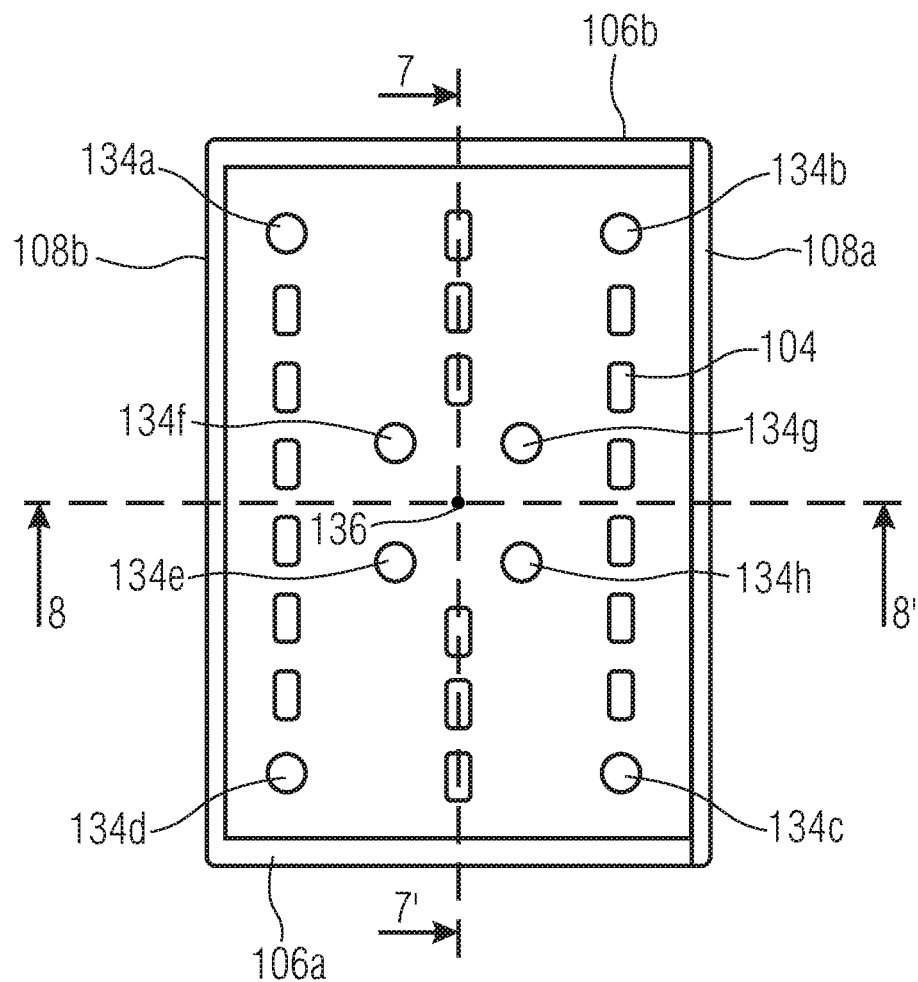
FIG. 6 shows a top view onto a box according to FIG. 1 whose floor according to one embodiment of the invention includes a plurality of openings for receiving supporting bars.

FIG. 6 shows a top view onto a box according to FIG. 1, whose floor 102, apart from the plurality of ventilation openings, comprises further openings 134a to 134h. In the embodiment illustrated according to FIG. 6, the box floor 102 includes eight openings 134a to 134h, wherein the first four openings 134a to 134d are arranged in the respective corners of the floor 102. According to embodiments of the invention, the openings 134a to 134d are each spaced apart from the edges closest to the respective openings with the same distance.

In a central area of the floor surface 102 for further openings 134e to 134h are arranged, wherein the openings 134e and 134f comprise the same distance to the long edge of the floor 102 closest to the openings adjacent to the side wall 108b. Likewise, the openings 134g and 134h comprise the same distance to the long edge of the floor closest to those openings adjacent to the side wall 108a. The openings 134f and 134g comprise the same distance to the short edge of the floor 102 adjacent to those openings adjacent to the end wall 106b, and the openings 134e and 134h comprise the same distance to the short edge adjacent to the first end wall 106a. The distances of the openings to the respective edges are as follows:

The openings have a diameter which is in a range from approximately 0.1 cm to approximately 5 cm.

As it may be seen, the openings are evenly distributed across the floor 102 and are provided to allow the penetration of transport bars to be described later into the interior of the box, so that a support or carrier 118 arranged on the floor 102 (see FIGS. 3 and 4) is simultaneously lifted to a position above the floor by the penetrating supporting bars. In the embodiment illustrated in FIG. 6 it was determined that for a rigid cardboard box the arrangement of the openings 134a to 134h is sufficient to enable a uniform lifting of the cardboard box loaded with products, wherein the box is resting on the floor surface. Other positions of the holes and also more or less holes may be provided depending on the products primarily to be transported by the box and on the type of the carrier 118, in particular depending on its stiffness. For stiffer materials less holes are necessitated than for less stiff materials. Advantageously, the openings, as illustrated in FIG. 6, are arranged symmetrically with respect to a center 136 of the floor 102.

Figure 7A:
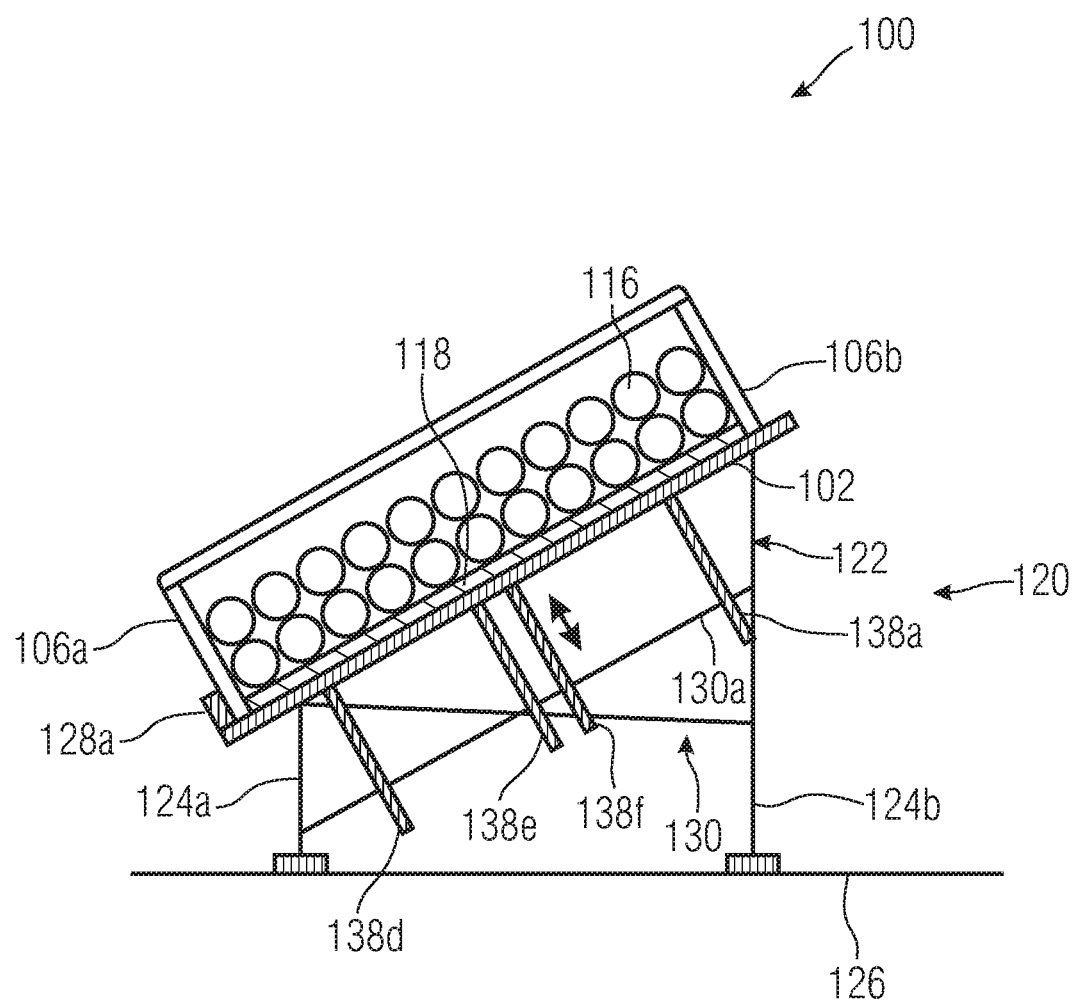
FIG. 7(a) shows receiving a filled box and FIG. 7(b) shows receiving a partially emptied box.
Figure 7B:
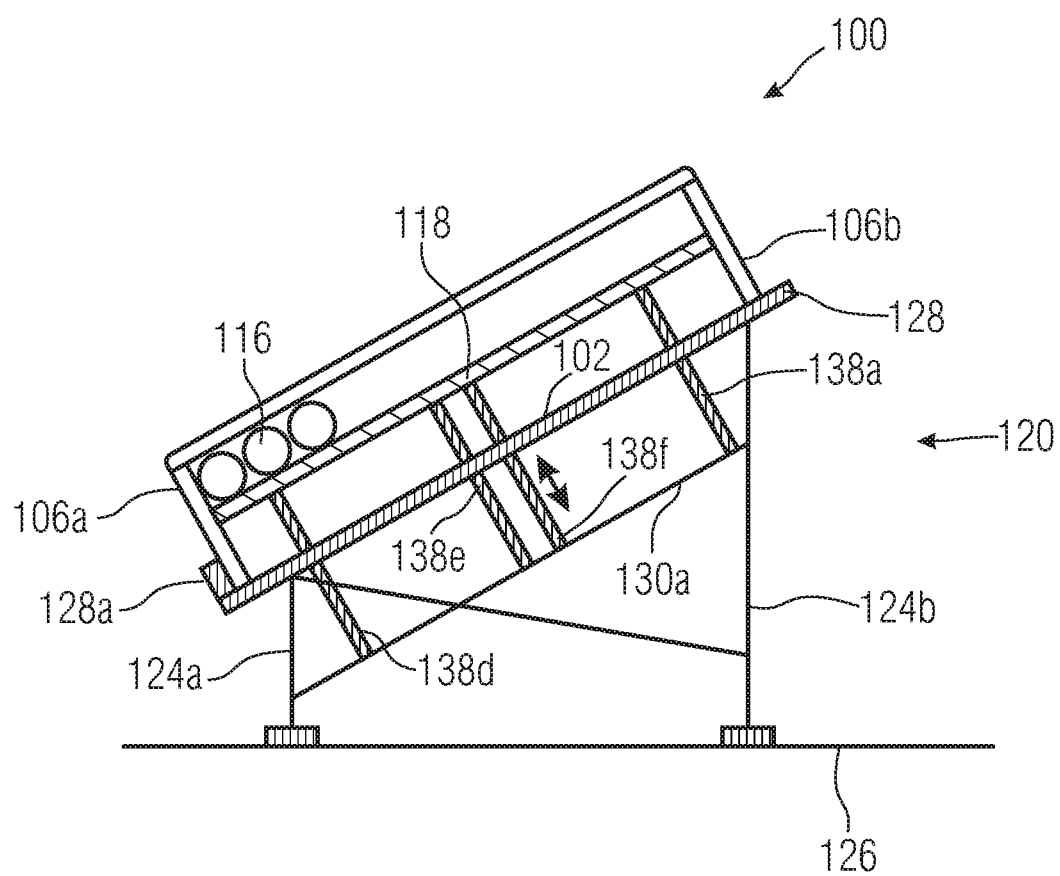

FIG. 7 shows a schematical illustration of a rack according to embodiments of the invention, which is provided for receiving boxes according to embodiments of the invention, wherein FIG. 7(a) shows receiving a fully filled box and FIG. 7(b) shows receiving a partially emptied box. FIG. 7 shows a sectional illustration of a rack with a box 100 applied thereon along line 7-7' of FIG. 6. The rack basically corresponds to the rack according to FIG. 5, which, however, additionally includes supporting bars 138a-138d, arranged in FIG. 7(a) in a position, so that the ends of the transport bars 138a-138b facing the box are arranged below the supporting structure 128. The supporting bars may be manufactured from a suitable material, for example a metal, plastics, wood or the like. In the example illustrated in FIG. 7(a), the supporting bars 138a-138d are arranged at a strut 130a of the strutting 130. It is to be noted that according to other embodiments, the supporting bars 138a-138d may also be mounted differently, for example at additional supporting structures arranged at the supporting frame 130. In FIG. 7(a) the supporting bars 138a-138d are located in the retracted or lower position below the supporting structure 128, so that the same do not engage the fully filled box 100 arranged on the supporting structure 128.

At this point it is to be noted that in FIG. 7(a) due to the sectional illustration only four supporting bars are illustrated. The supporting bars 138a-138d in the embodiment illustrated with respect to FIGS. 6 and 7 are associated with the openings 134b, 134c, 134g and 134h. The rack 120 includes further four supporting bars which are not illustrated in the figures which are associated with the openings 134a, 134d, 134e and 134f of the box illustrated in FIG. 6. Also those supporting bars not illustrated in FIG. 7(a) are located in the position illustrated in FIG. 7(a) below the supporting structure 128 or below the box floor 102.

The bottom position of the supporting bars may alternatively also be selected so that the same partially penetrate the openings in the box floor without penetrating the interior of the box in order to thus cause a locking of the boxes on the supporting structure 138 and thus an improved stability.

FIG. 7(b) shows a situation in which already a plurality of products have been removed from the box 100 so that for example only a small number of products 116 is arranged in an area adjacent to the first end wall 106a of the box, similar to the box illustrated in FIG. 5. As it may be seen from FIG. 7(b), with the rack according to one embodiment of the invention, the supporting bars 138a-138d are now brought into a second position, however, in which the supporting bars 138a-138d and also the not illustrated supporting bars penetrate the interior of the box 100 through the openings 134a-134h and lead to a simultaneous lifting of the support 108 and thus of the products 116 arranged thereon, so that the same are arranged at a distance from the floor 102 of the box. According to embodiments of the invention, the supporting bars are set such that the products are arranged adjacent to the upper edge of the box. By this, perceiving or seeing the products and also an improved presentation of the same with respect to an observer is guaranteed as on the one hand also the remaining products 116 located in the front area of the box are better visible, and on the other hand also products arranged in the lower layers may be presented well to a viewer or observer.

Embodiments of the invention are not limited to a presentation or arrangement of the box 100 at an angle with respect to the floor surface 126, rather the supporting structure 128, as already mentioned above, may also be arranged substantially in parallel to the footprint or base 126. Also in this case, for an improved presentation of the products 116 in the box 100, when more products are removed, an insertion of the supporting bars into the interior of the box is caused in order to guarantee an arrangement of the products above the floor surface, for example adjacent to the upper edge of the box. The supporting bars 138a-138d may, as illustrated in FIG. 7, be arranged movably at the rack 120 or its frame 130 in order to be moved between the lower retracted position illustrated in FIG. 7(a) and the extended upper position illustrated in FIG. 7(b). Alternatively, in the situation illustrated in FIG. 7(a) also only corresponding receiving elements for mounting supporting bars at the supporting frame of the rack 120 may be provided which are used when a raised presentation of the products 116 in the form according to FIG. 7(b) is desired. In this case, the rack which is then similar to FIG. 5 in the situation in which the box is full, is then supplemented by the supporting bars 138 when one or several layers of products 116 have already been removed from the box.

If the supporting bars are mounted to the rack 120, the same may be moved either linearly from the bottom to top from the first into the second position or be folded from the first position into the second position or be moved in another suitable way between the two positions.

Figure 8:
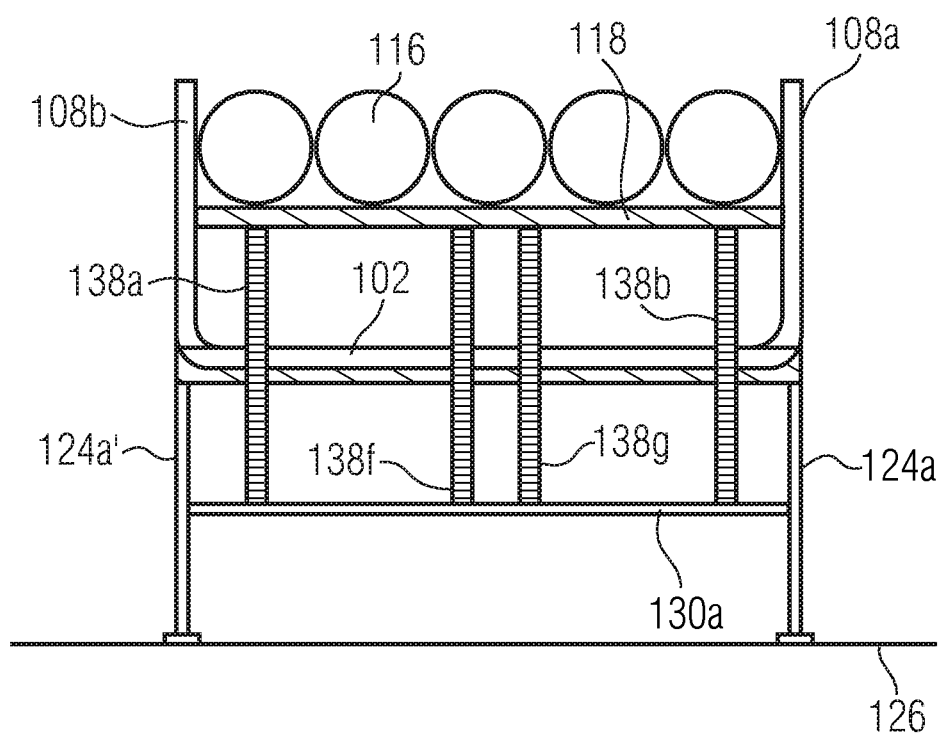
FIG. 8 shows a sectional illustration along line 8-8' of FIG. 6 in a situation in which a raised positioning of the products of the bottommost layer is desired.

FIG. 8 shows a sectional illustration along the line 8-8' of FIG. 6 in a situation in which a raised positioning of the products 116 of the bottom-most layer is desired. As it may be seen, the carrier 118 is lifted by the illustrated bars 138a and 138b and the remaining bars, wherein in FIG. 8 further bars 138g and 138f are illustrated which penetrate into the interior of the box through the openings 134a, 134b, 134f and 134g.

The use of the supporting bars described with reference to FIGS. 7 and 8, in connection with the rack 120 and the corresponding implementation of the box according to FIG. 6 thus enables to securely prevent the above-mentioned problems in the presentation of products and to guarantee that products are arranged at a desired position within a height with reference to the floor of the box, wherein this height is selected for an optimum position of the products 116. According to embodiments of the invention, a plurality of layers of products may be arranged within a box 100, and it may, for example, be provided with each layer which has been removed, to introduce the supporting bars somewhat further into the interior of the box to guarantee an equal positioning of the product layers with respect to the upper edge of the box. In this respect, the bars may, for example, be implemented telescopically or, for example, linearly shiftable in order to allow a stepped or a continuous setting of the penetration depth, for example by means of an actuator or servo motor.

According to embodiments of the invention, the openings in the box floor may comprise the same or different dimensions, for example, the openings arranged in the area of the corners of the floor may comprise a larger diameter than those in the central area of the floor. The supporting bars are then to be adapted accordingly.

Although some aspects were described in connection with a device, it is obvious that those aspects also represent a description of the corresponding method, so that a block or a member of a device may also be regarded as a corresponding method step or as a feature of a method step. Analog to that, aspects which were described in connection with a or as a method step also represent a description of a corresponding block or detail or feature of a corresponding device.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A system for presenting products, comprising:
   a carrier;
   a box comprising: a floor; two end walls; two side walls; and a plurality of openings in the floor; wherein the carrier is inserted into the box, wherein each of the openings is dimensioned to receive a supporting bar, and wherein the openings are arranged to uniformly lift the carrier inserted into the box using supporting bars introduced into the openings and position the carrier at a position above the floor; and
   a rack for receiving said box, comprising: a supporting frame for receiving the box; and a plurality of supporting bars, mountable to the supporting frame such that the supporting bars, when placing the box onto the supporting frame penetrate through the openings in the floor of the box into an interior of the box;
   wherein the box comprises several layers of products,
   wherein the box is arranged on the rack with the supporting bars in a first position, when the box comprises a predetermined number of the layers of products, and
   wherein the box is arranged on the rack with the supporting bars in a second position, when one or several layers of the products have been removed from the box.

2. The system according to claim 1, wherein a penetration depth of the supporting bars into the interior of the box is increased with a decreasing number of the layers of products, so that remaining ones of the products are arranged close to an upper edge of the box.

3. A method for the presentation of products, comprising: arranging a carrier and a box, the box comprising: a floor; two end walls; two side walls; and a plurality of openings in the floor; wherein the carrier is inserted into the box, wherein each of the openings is dimensioned to receive a supporting bar, and wherein the openings are arranged to uniformly lift the carrier inserted into the box using supporting bars introduced into the openings and position the carrier at a position above the floor, which comprises a predetermined number of layers of products, on a rack for receiving said box, comprising: a supporting frame for receiving the box; and a plurality of supporting bars, mountable to the supporting frame such that the supporting bars, when placing the box onto the supporting frame penetrate through the openings in the floor of the box into an interior of the box, whose supporting bars are in a first position; and if one or several layers of the products have been removed from the box, moving the supporting bars from the first position into a second position, wherein the supporting bars penetrate into the box and lift the carrier with the remaining ones or layers of the products arranged thereon with respect to the floor of the box.

4. The method according to claim 3, wherein a penetration depth of the supporting bars into the interior of the box is increased with a decreasing number of the layers of products, so that remaining ones of the products are arranged close to an upper edge of the box.

\* \* \* \* \*